United States Patent [19]
Holder et al.

[11] 3,878,180
[45] Apr. 15, 1975

[54] POLYMERIZATION OF ACRYLIC ACID ESTERS

[75] Inventors: Charles B. Holder, Wappingers Falls; Donald R. Lachowicz, Fishkill; Isaac D. Rubin, Wappingers Falls; George S. Saines, Fishkill, all of N.Y.

[73] Assignee: Texaco Inc., New York, N.Y.

[22] Filed: July 9, 1973

[21] Appl. No.: 377,461

Related U.S. Application Data

[63] Continuation-in-part of Ser. No. 98,175, Dec. 14, 1970, abandoned.

[52] U.S. Cl. .... 260/89.5 A; 260/31.8 R; 260/86.1 E
[51] Int. Cl. ......... C08f 3/64; C08f 3/66; C08f 3/68
[58] Field of Search ...... 260/89.5 R, 89.5 A, 86.1 E

[56] References Cited
UNITED STATES PATENTS

| | | | |
|---|---|---|---|
| 2,529,315 | 11/1950 | Serniuk | 260/84.7 |
| 2,557,363 | 6/1951 | Serniuk | 260/84.3 |
| 2,558,139 | 6/1951 | Knock et al. | 260/89.5 A |
| 2,647,878 | 8/1953 | Lee | 260/85.5 N |
| 3,222,334 | 12/1965 | Demme | 260/89.5 A |

OTHER PUBLICATIONS

Schildkneckht, Vinyl and related polymers, John Wiley and Sons, Inc., New York (1959), pages 14 and 15.

*Primary Examiner*—Harry Wong, Jr.
*Attorney, Agent, or Firm*—T. H. Whaley; C. G. Ries

[57] ABSTRACT

Vinyl monomers of the type exemplified by the alkyl methacrylates are homopolymerized in the presence of amine catalysts such as morpholine, piperidine, etc. to yield high molecular weight products.

15 Claims, No Drawings

POLYMERIZATION OF ACRYLIC ACID ESTERS

This application is a continuation-in-part of application Ser. No. 98,175, filed Dec. 14, 1970, now abandoned.

FIELD OF THE INVENTION

This invention relates to a method for the homopolymerization of vinyl-type compounds in the presence of an amine catalyst. More particularly, this invention relates to a method for the homopolymerization of polyacrylic acid esters under non-emulsifying conditions in the presence of certain novel amine initiators.

DESCRIPTION OF THE PRIOR ART

Numerous catalysts are known in the art which are useful for polymerizing compounds having a vinyl linkage including peroxides, persulfates, azo initiators, etc. Likewise, a wide variety of polymerization systems have been employed in preparing vinyl polymers such as bulk, solution, suspension and emulsion types.

All of the above-mentioned polymerization processes suffer from a variety of disadvantages. For example, the compounds which contain directly-linked oxygen atoms, such as hydrogen peroxide, benzoyl peroxide, lauroyl peroxide, potassium persulfate and other widely employed catalysts of this type, may alter the color of dyestuffs added during polymerization, they may oxidize the polymer with resulting discoloration and crosslinking effects and the polymers obtained may contain oxidizing residues which can preclude the use of such polymers in some applications. Further, fragments derived from the art-employed catalysts may promote degradation of the finished polymer product.

Processes for the emulsion polymerization of conjugated diolefins such as butadiene or active monolefins of the vinyl-type such as acrylic acid esters or of certain unsaturated compounds which are copolymerizable with conjugated diolefins are set forth in U.S. Pat. Nos. 2,529,315 and 2,557,363. In these two processes the emulsion polymerization is conducted in the presence of, for example, morpholine or piperazine and an oxygen-liberating catalyst such as benzoyl peroxide, tertiary butyl hydroperoxide, etc. Both of the processes referred to here are complicated in that they require emulsifiers such as alkali metal or ammonium salts, they require oxygen liberating catalysts in addition to an amine promoter and they require that substantial amounts of water be present in order to form the desired emulsion.

One object of this invention is to provide a process for homopolymerizing acrylic acid esters in which the catalyst employed does not yield fragments which promote the degradation of the polymer product.

Another object of this invention is to provide a process for the homopolymerization of acrylic acid esters which utilizes a relatively inexpensive amine initiator.

Another object of this invention is to provide a convenient method for homopolymerizing acrylic acid esters which does not require a solvent.

SUMMARY OF THE INVENTION

In its broadest aspect, this invention relates to a process for homopolymerizing acrylic acid esters by contacting the ester under non-emulsifying conditions with a compound selected from the group consisting of piperidine, morpholine, piperazine, alkyl-substituted piperidines, morpholines and piperazines, wherein the alkyl substituents are attached to ring carbon atoms, and dialkanolamines.

The products of this invention can contain one or more of the various conventional additives such as dyes, pigments, lubricants, plasticizers and modifying agents. The process of this invention may be conducted as a batch or as a continuous process, as desired.

The polyacrylates of this invention can be utilized in preparing molding compositions, for coatings and, in general, for any of the application for which such polyacrylates are now employed.

DETAILED DESCRIPTION OF THE INVENTION

As previously pointed out, a wide variety of amine initiators are useful in the process of this invention; however, it has been found that an especially valuable group of initiators includes compounds of the formula:

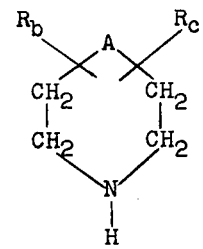

wherein $R_b$ and $R_c$ are selected from the group consisting of hydrogen and alkyl of from 1 to 5 carbon atoms and wherein $R_b$ and $R_c$ are each attached to different ring carbon atoms, and A is selected from the group consisting of $CH_2$, O, and NH.

Preparation of the piperidine-type initiators can be accomplished by hydrogenation of the corresponding pyridine compound in the presence of Raney nickel at about 200°C. (See Acheson, R.M., An Introduction to the Chemistry of Heterocyclic Compounds, Second Edition, Interscience Publishers, New York, 1967, page 201). Morpholine-type initiators may be synthesized by the method described by Campbell, U.S. Pat. No. 2,034,427, in which, for example, dichlorodiethyl ether or an alkyl-substituted derivative of dichlorodiethyl ether dissolved in benzene is reacted with anhydrous ammonia at about 1,750 psig. Likewise, piperazine and piperazine derivatives useful in this invention can be prepared by reacting the appropriate aliphatic diamine with ethylene oxide followed by vapor phase dehydration and ring closure as set forth by Acheson, R.M., ibid, page 347.

Illustrative of suitable initiators for use in the process of this invention are piperidine, 2-methylpiperidine, 3-ethylpiperidine, 4-isopropylpiperidine, 5-ethyl-2-methylpiperidine, 2,3-di-n-butyl-piperidine, 3,5-di-n-pentylpiperidine, morpholine, 2-methylmorpholine, 2,6-diethylmorpholine, 3-n-propylmorpholine, 3,5-diisobutylmorpholine, 3-n-pentylmorpholine, piperazine, 2-ethylpiperazine, 3-isopropylpiperazine, etc. Mixtures of the above-mentioned amine initiators can be employed, if desired.

A wide range of temperatures can be utilized in conducting the polymerization process of this invention although, usually the process is carried out at temperatures ranging from about 10° to 150°C., and, preferably, at about 30° to about 120°C. Pressures of from about atmospheric up to about 100 psig or more can likewise be employed, if desired.

Although only a catalytic amount of the initiator is required, generally in practicing this polymerization process from about 0.1 to about 10 volume percent based on the volume of the acrylic acid ester charged to the reactor is used and, preferably, the amount is between about 0.1 and about 5 volume percent on the same basis.

The time required to effect a suitable degree of conversion of the monomer to the polymer will vary widely depending on the particular monomer being polymerized, the specific initiator added and the quantity of initiator as well as the other operating conditions. Generally, from about 1 to about 6 hours will suffice to give a satisfactory yield of the acrylate polymer.

Recovery of the polymer from the monomer remaining at the conclusion of the polymerization process can be accomplished in a variety of ways well known in the art. For example, the polymer can be precipitated by pouring the reaction mixture into a monohydric alcohol, such as methanol, ethanol, etc., previously acidified with sufficient mineral acid, such as hydrochloric acid to neutralize the amine initiator. After the mixture has been allowed to stand for a number of hours, e.g., from 1 to 24 or more, the methanol is removed by decantation or by any other suitable means following which the polymer is rinsed with additional quantities of the monohydric alcohol and dried in a vacuum oven at about room temperature.

Acrylic acid ester monomers which may be polymerized by the method of this invention include compounds of the formula:

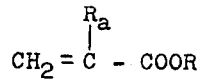

wherein R is alkyl of from 1 to about 30 carbon atoms, as exemplified by methyl, ethyl, propyl, butyl, pentyl, hexyl, heptyl, nonyl, decyl, lauryl, myristyl, cetyl, stearyl, etc. and isomers thereof, and $R_a$ is selected from the group consisting of hydrogen and alkyl of from 1 to 3 inclusive carbon atoms as exemplified by methyl, ethyl, propyl and isopropyl. Mixtures of the acrylic acid esters may be employed, if desired.

The higher alkyl acrylates can be conveniently prepared from the corresponding methyl acrylate by alcoholysis. Usually, the reaction is conducted with an excess of the alcohol and a small amount of a mineral acid, such as sulfuric acid, as described in Textbook of Polymer Science, Billmeyer, F.W., Interscience Publishers, New York, 1966, page 403.

Since the polymerization of acrylates is drastically inhibited by oxygen, the method of this invention is preferably carried out in an inert atmosphere, which can be, for example, nitrogen, argon, etc., although for reasons of economy, nitrogen is the usual gas employed.

Other materials such as carbon tetrachloride, dimethylformamide, as well as plasticizers, such as dibutyl phthalate, ultra-violet absorbers, pigments and dyes, chain transfer agents including alkyl mercaptans, such as dodecyl mercaptan, aromatic disulfides, such as dixylyl disulfide, and other halogen compounds, to modify the polymerization reaction or the properties of the final products may be added to the polymerization mixtures, if desired. If utilized, generally from about 0.01 to 5.0 volume percent of the modifier based on the volume of the acrylic acid ester is incorporated in the charge.

The polymers formed by the method of this invention possess high molecular weights, i.e., from about 50,000 to about $5 \times 10^6$ or more, and exhibit highly satisfactory physical properties making them useful for the wide variety of applications for which such acrylate polymers are normally employed.

EXAMPLES I-XV

In these examples, the polymerization reactions were conducted in 8 oz. screw-cap bottles provided with liners of sheet Teflon over rubber sub-liners. After the bottles had been purged with pre-purified nitrogen, the charge materials, which likewise had been purged with pre-purified nitrogen, were pipetted into the bottles. The remaining air was swept from the void space with nitrogen, following which the bottles were sealed and then tumbled in a rotating rack which was held in a 65°C. constant temperature bath for a designated time. At the end of the heating period, the bottles were cooled and the polymer precipitated from the reaction mixture by pouring the contents of the bottles into absolute methanol containing slightly more than the amount of hydrochloric acid needed to neutralize the amine initiator. The products were allowed to remain overnight in the methanol which was then decanted and the recovered polymer dried in a vacuum oven at room temperature.

Pertinent data relating to these experiments are shown in Table 1.

TABLE I

POLYMERIZATION RUNS MADE IN SCREW-CAP BOTTLES IN TUMBLING RACK

| Example | Monomer | | Inhibitor | Modifier | | Initiator | | Conditions | |
|---|---|---|---|---|---|---|---|---|---|
| | Type | ml. | ppm | Type | ml. | Type | ml. | Temp. (°C) | Time (hrs) |
| I | Methyl methacrylate | 110 | 0 | $DMF_1$ | 10 | Morpholine | 0.75 | 65 | 5 |
| II | Methyl methacrylate | 120 | 0 | — | — | Morpholine | 0.75 | 65 | 3 |
| III | Methyl methacrylate | 120 | $10_3$ | — | — | Morpholine | 0.75 | 65 | 3 |
| IV | Methyl methacrylate | 50 | $200_2$ | $CCl_4$ | 5 | Morpholine | 0.4 | 65 | 5 |
| V | Methyl methacrylate | 50 | $10_3$ | $CCl_4$ | 5 | Morpholine | 0.4 | 65 | 5 |
| VI | Butyl methacrylate | 50 | $203_2$ | $CCl_4$ | 5 | Morpholine | 0.4 | 65 | 5 |
| VII | Lauryl methacrylate | 50 | $115_3$ | $CCl_4$ | 5 | Morpholine | 0.4 | 65 | 5 |
| VIII | Lauryl methacrylate | 50 | $148_3$ | DMF $CCl_4$ | 5 5 | Morpholine | 0.4 | 65 | 5 |
| IX | Lauryl methacrylate | 50 | $148_3$ | $CCl_4$ | 5 | Morpholine | 0.4 | 65 | 5 |
| X | Lauryl methacrylate | 50 | $148_3$ | DMF $CCl_4$ | 5 5 | Morpholine | 0.4 | 65 | 5 |
| XI | Lauryl methacrylate | 50 | $148_3$ | DMF $CCl_4$ | 5 5 | Morpholine | 0.4 | 65 | 5 |

TABLE I—Continued

POLYMERIZATION RUNS MADE IN SCREW-CAP BOTTLES IN TUMBLING RACK

| Example | Monomer | Inhibitor | | Modifier | | Initiator | | Conditions | |
|---|---|---|---|---|---|---|---|---|---|
| | Type | ml. | ppm | Type | ml. | Type | ml. | Temp. (°C) | Time (hrs) |
| XII | Methyl methacrylate | 50 | 150[4] | $CCl_4$ | 5 | Morpholine | 0.4 | 65 | 5 |
| XIII | 6 | 50 | 170[4a] | $CCl_4$ | 5 | Morpholine | 0.4 | 65 | 5 |
| XIV | Ethyl acrylate | 25 | 0 | $CCl_4$ | 2.5 | Morpholine | 0.2 | 65 | 5 |
| XV | Methyl methacrylate | 50 | 0 | — | — | Morpholine | 1.0 | 65 | 5 |

| Example | Product (g.) | Monomer Conversion (%) | Molecular Weight[5] of Product |
|---|---|---|---|
| I | 27.1 | 26.2 | — |
| II | 13.2 | 14.9 | — |
| III | 0.03 | 0.03 | — |
| IV | 8.8 | 18.7 | 530,000 |
| V | 7.0 | 14.9 | — |
| VI | 43.6 | 97 | 455,000 |
| VII | 22.8 | 52 | — |
| VIII | 33.5 | 77 | — |
| IX | 21.5 | 49 | — |
| X | 31.1 | 71 | — |
| XI | 33.6 | 77 | — |
| XII | 12.0 | 25.5 | 361,000 |
| XIII | 28.1 | 63.6 | — |
| XIV | 7.0 | 30.2 | 530,000 |
| XV | 2.07 | 4.9 | 2,600,000 |

1 - dimethylformamide.
2 - quinone.
3 - monomethyl ether of hydroquinone.
4 - A blend of monomethyl ether of hydroquinone and quinone (70:80 ratio by weight).
4a - A blend of monomethyl ether of hydroquinone and quinone (80:90 ratio by weight).
5 - Molecular weights determined with membrane osmometer.
6 - A blend of butyl and lauryl methacrylates (40:60 ratio by weight).

As the data relating to Examples IV-XV inclusive in Table I above show, satisfactory yields of the polymethacrylate products can be achieved using monomers containing commercial levels of inhibitors provided the polymerization reaction is carried out in the presence of the amine catalyst and carbon tetrachloride. When the monomer contains a commercial inhibitor and no carbon tetrachloride is present in the reaction mixture, the yield of the polymer is extremely low as shown in Example III above.

the polymer was isolated by adding the reaction mixture to a large excess of methanol, thus precipitating the polymer, allowing the precipitate to soak for a period of time, separating the polymer and washing it with fresh methanol with concurrent size reduction, as for example, in a high speed blender. The molecular weights of the polymer products were determined by membrane osmometer.

Pertinent data relating to these examples are found in Table II which follows:

TABLE II

POLYMERIZATION RUNS MADE IN RESIN KETTLE

| Example | Monomers ml. | Modifier | | Initiator ml. | Temp. °C. | Polymer Weight g. | Monomer Conversion% | Molecular Weight of Polymer |
|---|---|---|---|---|---|---|---|---|
| | | Type | ml. | | | | | |
| XVI | 110[1] | DMF[4] | 10 | 0.75[2] | 80 | 24.1 | 23[5] | 635,000 |
| XVII | 110[1] | DMF[4] | 10 | 0.75[2] | 60 | 20.7 | 20[6] | 635,000 |
| XVIII | 110[1] | DMF[4] | 10 | 0.75[3] | 60 | 21.0 | 20 | 435,000 |
| XIX | 110[1] | DMF[4] | 10 | 0.75[2] | 45 | 16.9 | 16 | 647,000 |

1 - Methyl methacrylate
2 - Morpholine
3 - Piperidine
4 - Dimethylformamide
5 - Run stopped at end of 1.5 hr; too viscous to continue.
6 - Run stopped at end of 3.0 hr; too viscous to continue.

EXAMPLES XVI-XIX

In each of these experiments a 500 ml. resin kettle was utilized. After the kettle had been purged with pre-purified nitrogen, the catalyst and the uninhibited alkyl methacrylate, both previously purged with pre-purified nitrogen, were added at room temperature followed by further purging of the kettle freeboard space. Polymerization was achieved by maintaining the kettle and contents at 60°C. for 5 hours. At the conclusion of the run, As the examples set forth in Tables I and II above show, the process of this invention provides a convenient, economical method for the preparation of high molecular weight polyacrylate polymers.

The higher polyacrylates prepared by the process of this invention are oil-soluble and when added to a base stock, such as, for example, a base stock having a kin. viscosity of 46.4 cs. at 100°F., 6.72 cs. at 210°F.; VI 107; and a pour point of +5°F., in an amount of, for example, about 2 weight percent yield improved lubricating compositions exhibiting low pour points as well as high viscosity indices. Such high performance lubricants are highly desirable and often required for such applications as automobile and aircraft engines where a wide range of temperatures is encountered.

The use of acrylates, such as polymethacrylates, as VI improvers is more completely described in U.S. Pat. No. 2,604,453.

What is claimed is:

1. A method of hompolymerizing a monomer of the formula:

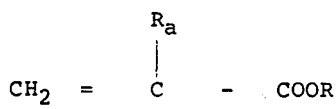

wherein R is alkyl of from 1 to 30 carbon atoms and $R_a$ is selected from the group consisting of hydrogen and alkyl of from 1 to 3 inclusive carbon atoms, which comprises contacting the monomer under non-emulsifying conditions with an initiator of the formula:

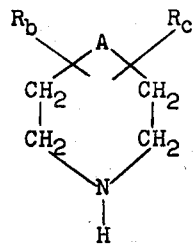

wherein $R_b$ and $R_c$ are selected from the group consisting of hydrogen and alkyl of from 1 to 5 carbon atoms, wherein $R_b$ and $R_c$ are each attached to different ring carbon atoms, and A is selected from the group consisting of $CH_2$, O and NH and wherein the said initiator is present in an amount from about 0.1 to about 10 volume percent based on the volume of the monomer.

2. The method of claim 1 wherein the polymerization is conducted at a temperature ranging from about 10°C. to about 150°C.

3. The method of claim 1 wherein the polymerization is conducted at a pressure of from about atmospheric to about 100 psig.

4. The method of claim 1 wherein the said monomer is methyl methacrylate.

5. The method of claim 1 wherein the said monomer is ethyl acrylate.

6. The method of claim 1 wherein the said monomer is butyl methacrylate.

7. The method of claim 1 wherein the said monomer is lauryl methacrylate.

8. The method of claim 1 wherein the said initiator is morpholine.

9. The method of claim 1 wherein the said initiator is piperidine.

10. The method of claim 1 wherein the polymerization is conducted in the presence of a modifier selected from the group consisting of dodecyl mercaptan, and dixylyl disulfide.

11. The method of claim 1 wherein the said monomer is contacted with the initiator under an atmosphere of an inert gas.

12. The method of claim 1 wherein the said monomer is methyl methacrylate, the said initiator is morpholine which is present in an amount of from about 0.1 to about 5 percent by volume based on the volume of the monomer and wherein the polymerization is conducted at a temperature of from about 10° to about 150°C.

13. The method of claim 1 wherein the said monomer is methyl methacrylate, the said initiator is piperidine which is present in an amount of about 0.1 to about 5 volume percent based on the volume of the monomer and the polymerization is conducted at a temperature of about 10° to about 150°C.

14. The method of claim 1 wherein the said monomer is butyl methacrylate, the said initiator is morpholine which is present in an amount of about 0.1 to about 5 volume percent based on the volume of the monomer and polymerization is conducted at a temperature of about 10° to about 150°C.

15. The method of claim 1 wherein the said monomer is ethyl acrylate, the said initiator is morpholine which is present in an amount of about 0.1 to about 5 volume percent based on the volume of the monomer and polymerization is conducted at a temperature of about 10° to about 150°C.

* * * * *